United States Patent
Huang

(10) Patent No.: US 7,540,062 B1
(45) Date of Patent: Jun. 2, 2009

(54) STRUCTURE FOR ARRAY COMBINATIONAL TYPE OF WINDSHIELD WIPER

(76) Inventor: Shih-Hsien Huang, 7F.-2, No.37, Jhengsin St., Zuoying District, Kaohsiung City, 813 (TW)

( * ) Notice: Subject to any disclaimer, the term of this patent is extended or adjusted under 35 U.S.C. 154(b) by 0 days.

(21) Appl. No.: 12/071,305

(22) Filed: Feb. 20, 2008

(51) Int. Cl.
*B60S 1/38* (2006.01)

(52) U.S. Cl. .............................. 15/250.201; 15/250.43
(58) Field of Classification Search ............. 15/250.43, 15/250.44, 250.201, 250.361
See application file for complete search history.

(56) References Cited

U.S. PATENT DOCUMENTS

| | | | | |
|---|---|---|---|---|
| 2,651,800 A | * | 9/1953 | Picon | 15/250.43 |
| 2,847,694 A | * | 8/1958 | Chambers | 15/250.43 |
| 3,088,155 A | * | 5/1963 | Smithers | 15/250.201 |
| 4,976,001 A | * | 12/1990 | Wright | 15/250.48 |
| 6,588,048 B2 | | 7/2003 | Ohyama | 15/250.43 |
| 7,150,066 B1 | | 12/2006 | Huang | 15/250.32 |
| 7,254,862 B2 | | 8/2007 | Hoshino | 15/250.47 |
| 2006/0090282 A1 | | 5/2006 | Hoshio | 15/250.44 |
| 2006/0179597 A1 | | 8/2006 | Hoshino et al. | 15/250.43 |

FOREIGN PATENT DOCUMENTS

JP     10-6932    *   1/1998

* cited by examiner

*Primary Examiner*—Gary K Graham
(74) *Attorney, Agent, or Firm*—Bacon & Thomas, PLLC

(57) ABSTRACT

A structure for an array combinational type of windshield wiper comprises an elastic curved strip, a supporting mount, and a plurality of lodging blocks and a plurality of counterweight blocks which are disposed on the elastic strip in an array. This arrangement provides flexibility in matching the length of the array of lodging blocks and counterweight blocks with the length of the elastic curved stripe such that various windshield wipers of different lengths and specifications can be easily produced.

5 Claims, 9 Drawing Sheets

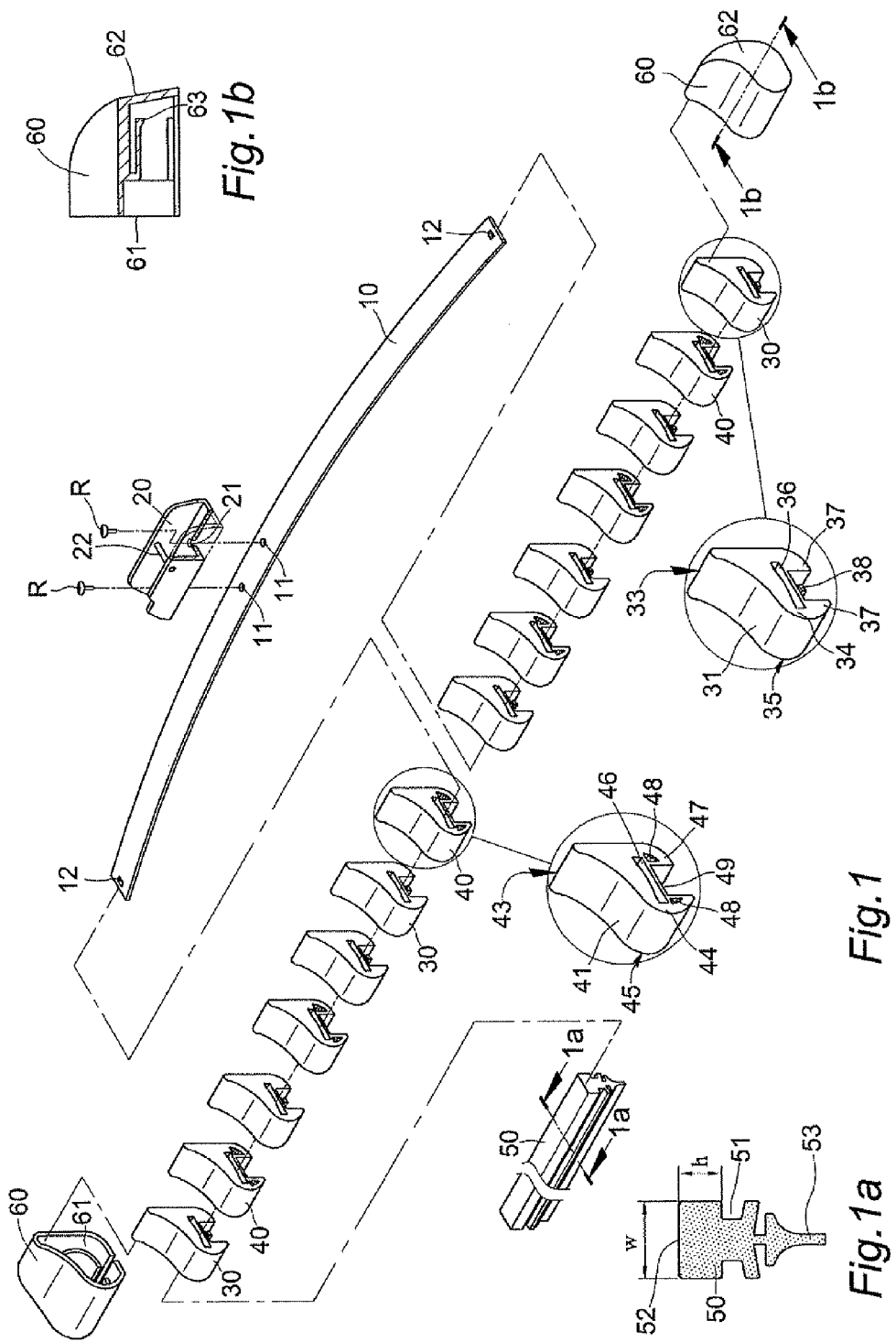

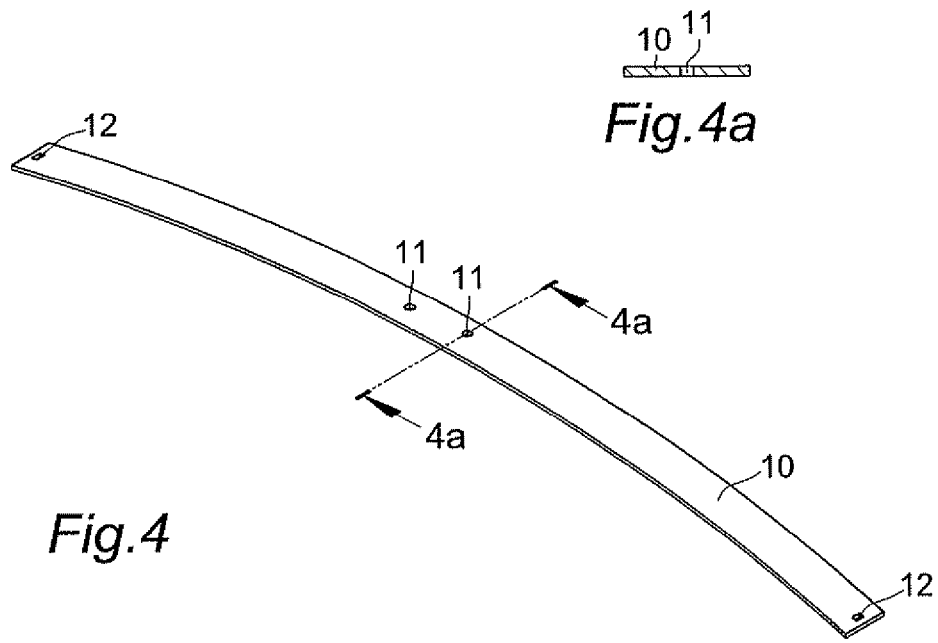
Fig. 4a
Fig. 4
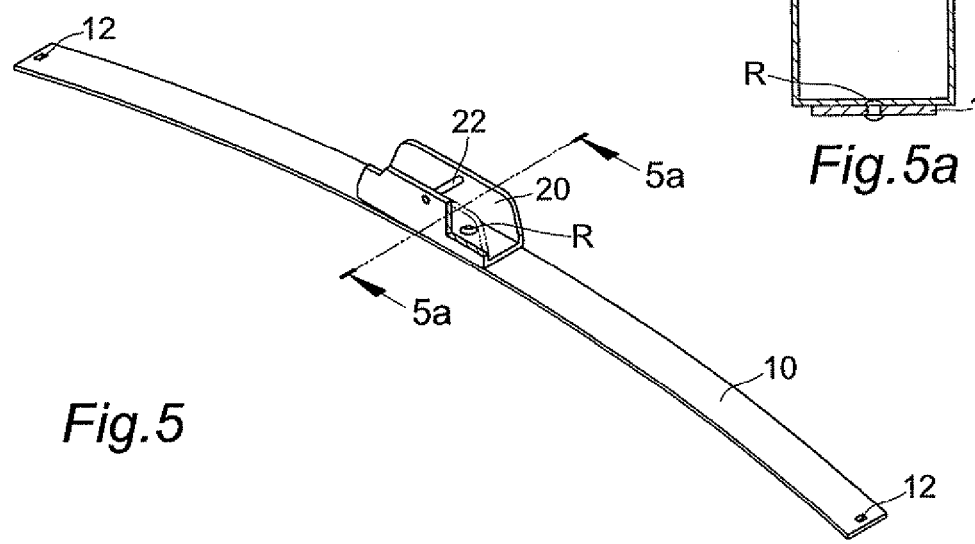
Fig. 5a
Fig. 5

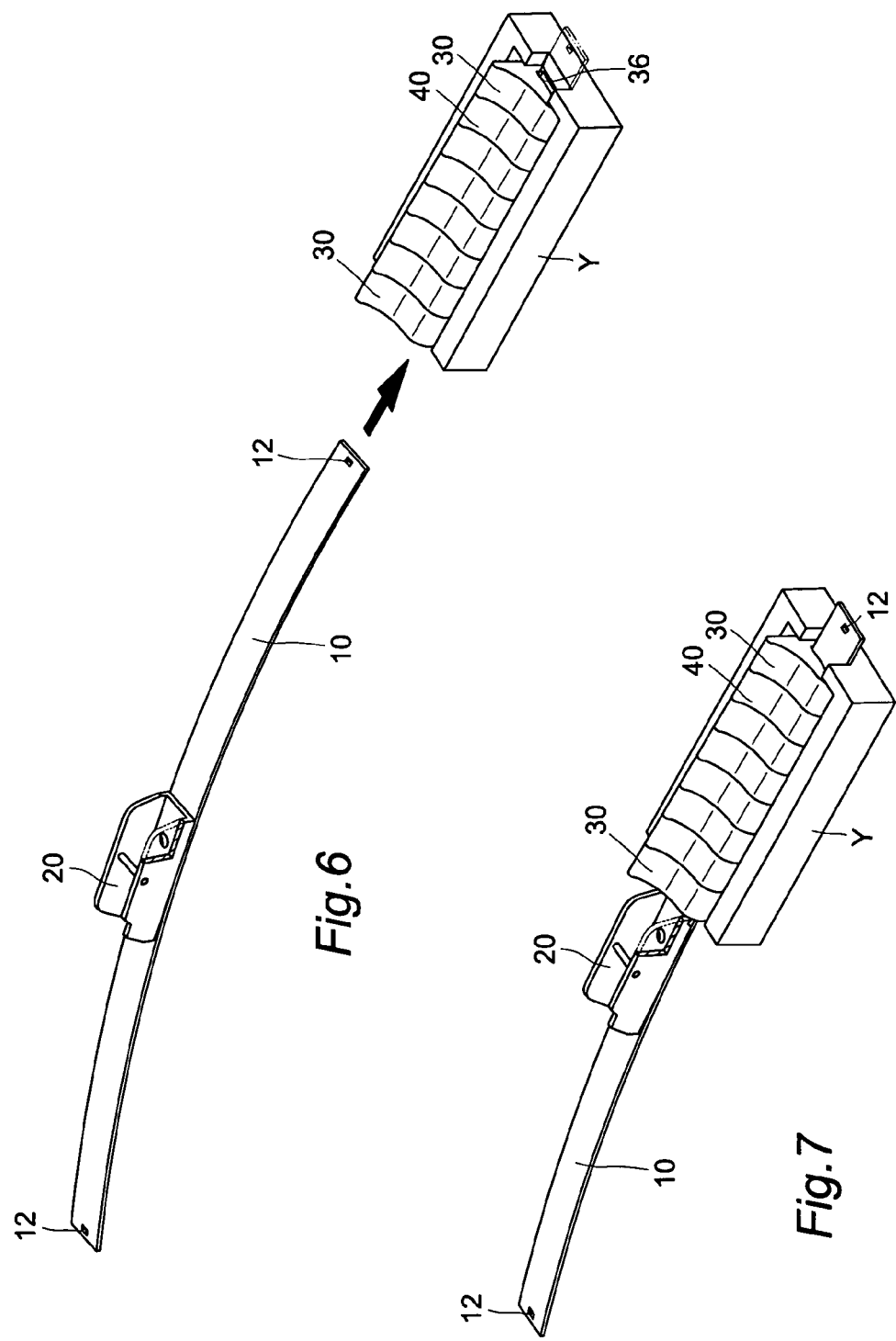

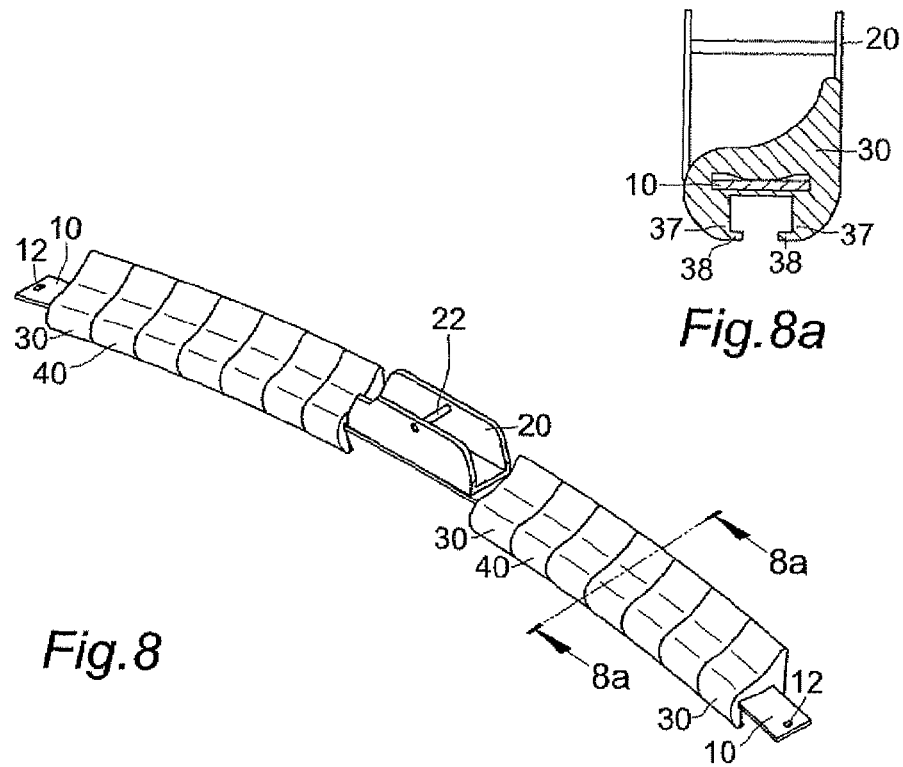
Fig.8
Fig.8a
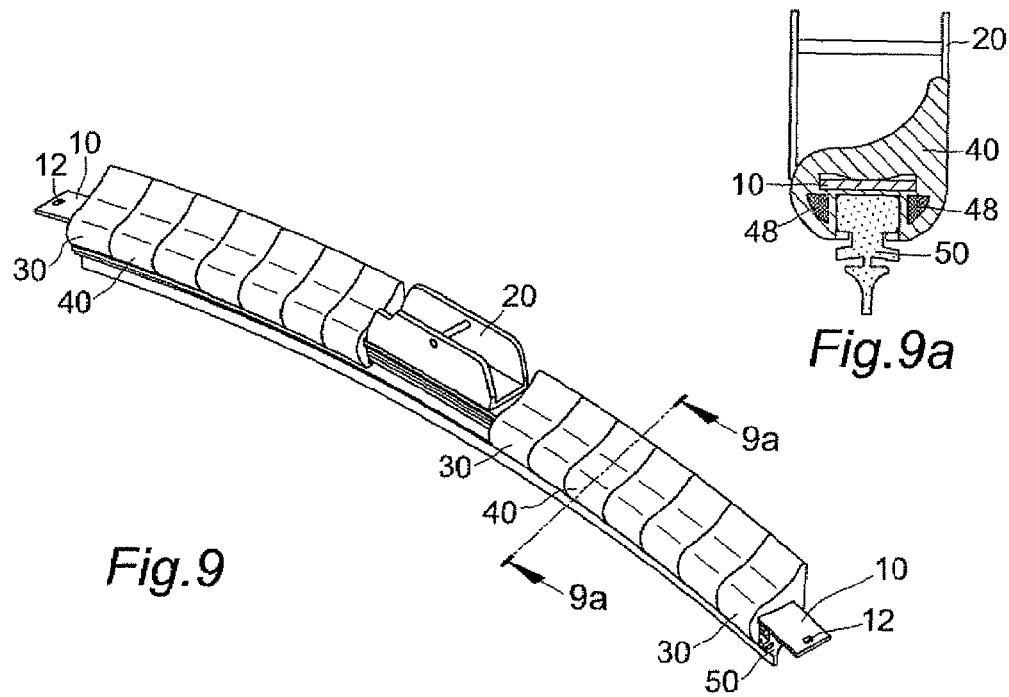
Fig.9
Fig.9a

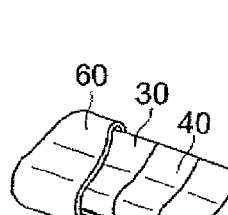
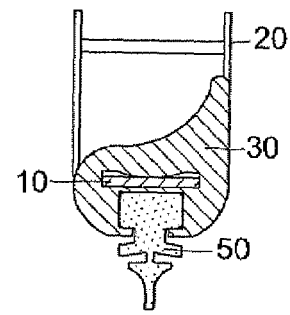
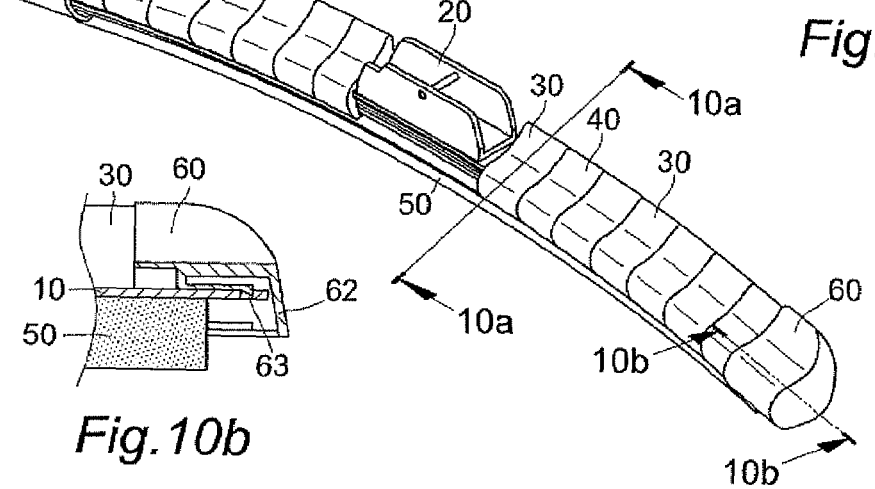
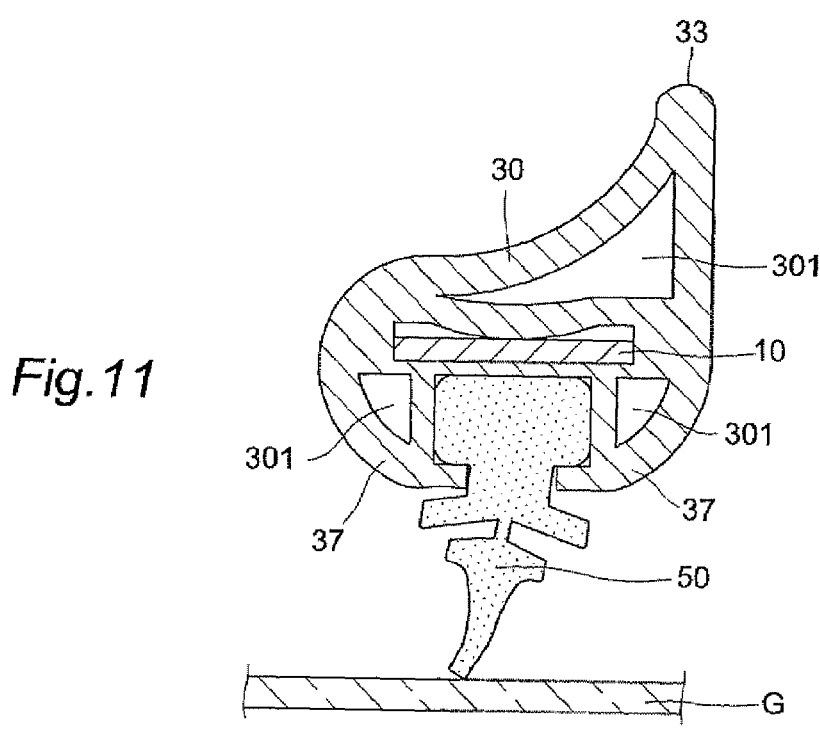

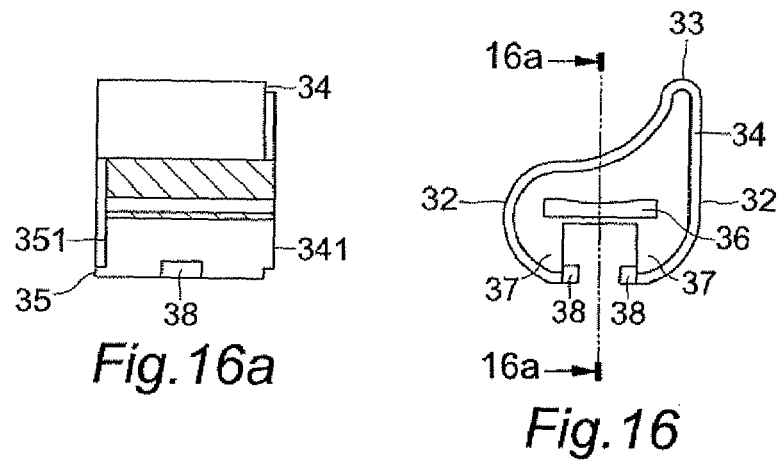
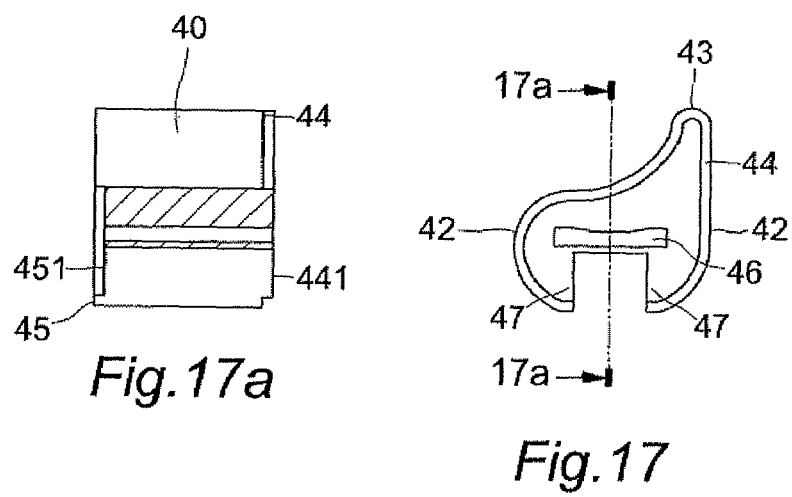
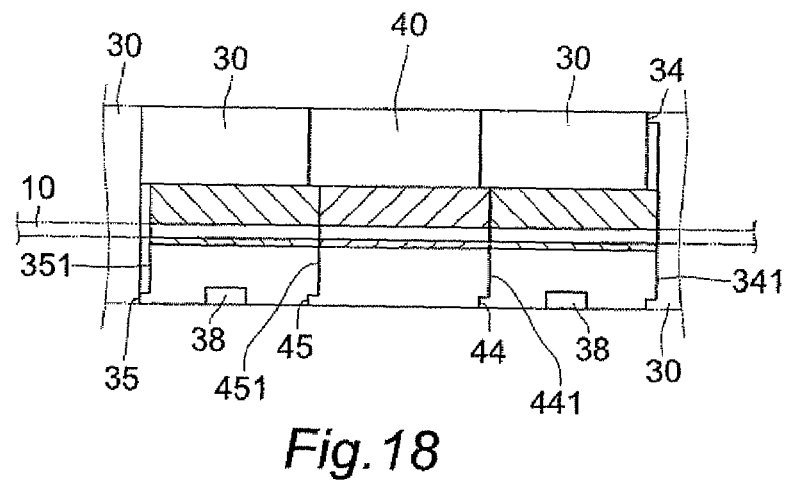

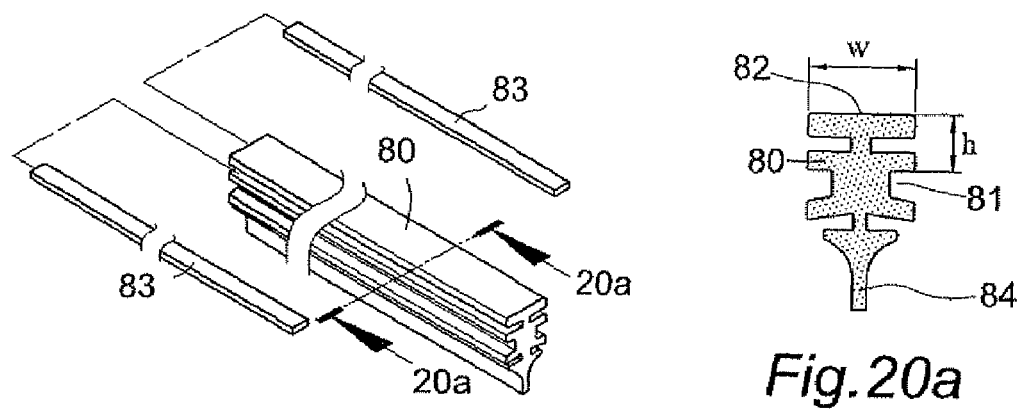
Fig.20
Fig.20a
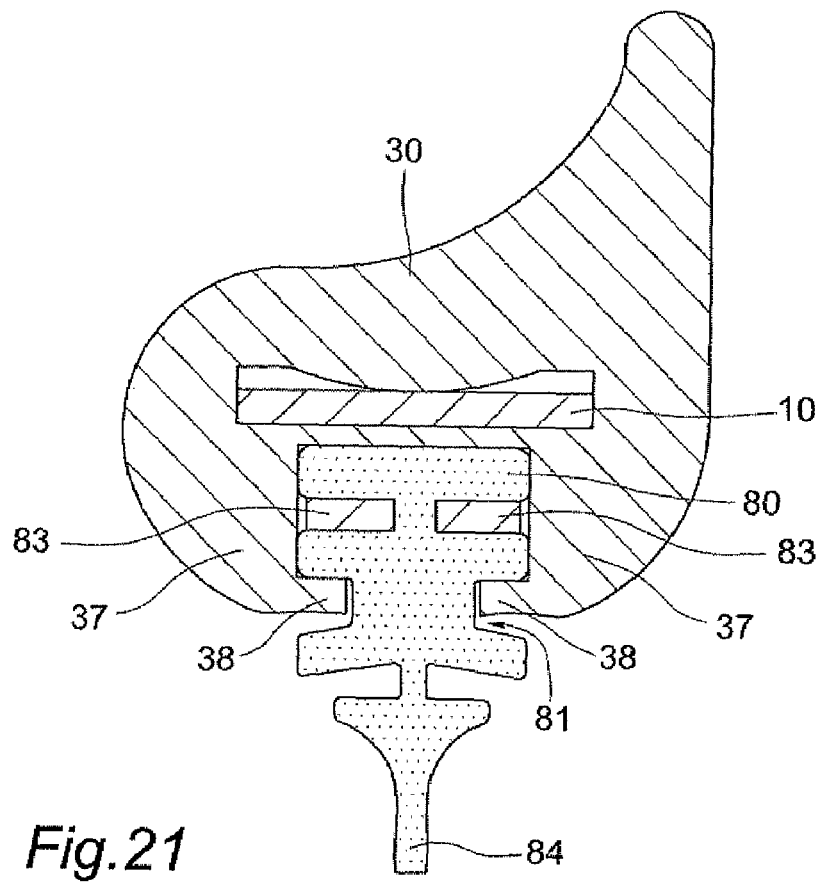
Fig.21

US 7,540,062 B1

STRUCTURE FOR ARRAY COMBINATIONAL TYPE OF WINDSHIELD WIPER

FIELD OF THE PRESENT INVENTION

The present invention relates to a structure for array combinational type of windshield wiper, particularly for one that not only evenly distributes the pressing elastic pressure over the windshield of various curvature but also completely and closely attaches over the windshield of different length and specifications so as to increase the scraping and wiping effect of the windshield wiper by means of suitably changing the number and array of the lodging block and counterweight block together with the length of the elastic curved strip. Thus, the manufacturing cost of the windshield wiper can be considerably reduced other than the effective scraping and wiping function of the windshield wiper.

BACKGROUND OF THE INVENTION

Following with the considerably increasing number of the various vehicles produced and marketed, the usage quantity of the windshield wiper is tremendously increased. To regularly replacing the windshield wiper for the safe purpose becomes one of the necessary routine jobs that also makes the consuming quantity of the windshield wiper relatively increase. However, different vehicle model has different superficial area of the windshield, so the length requirement of the windshield wiper is different from vehicle to vehicle. How to produce various windshield wipers in different lengths and specifications in effective and economical manufacturing process becomes the critical task and challenges to the businessmen of the windshield wiper. Accordingly, the structure of the windshield wiper is constantly changed and continuously improved. For examples, the USA issued patent number of U.S. Pat. No. 6,588,048, U.S. Pat. No. 7,150,066 and U.S. Pat. No. 7,254,862 as well as application published cases in numbers of US2006/0090282 and US2006/0179597 are the examples of prior arts in the related technical field.

However, it is generally well known that the superficial area of the windshield for sedan, recreational vehicle, van and truck is different from vehicle to vehicle. Therefore, the length and curvature of the windshield wiper must be different in accordance with the different requirement of each type of vehicle so as to have effective scraping and wiping function of the windshield wiper. In other words, the larger superficial area of the windshield is the longer of the windshield wiper needs. For certain length of the specific windshield wiper aforesaid, it may have effective scraping and wiping function for various windshield wipers of different curvatures but can not meet the requirement for various windshield wipers of the different lengths. Thus, for another length of the specific windshield wiper aforesaid, all the related components should be additionally re-produced accordingly. Therefore, the production for design of the windshield wiper aforesaid must prepare tremendously various relevant components in stock to meet the manufacturing requirements of various windshield wipers in different lengths and specifications, which will inevitably results in drawbacks of laborious inventory control and strenuous production management accordingly as well as lack of marketing competition.

SUMMARY OF THE INVENTION

The primary object of the present invention is to provide a structure for array combinational type of windshield wiper, which comprises an elastic curved strip, a supporting mount, plural lodging blocks, plural counterweight blocks, an elongate scraper and two terminal caps. By means of changing the number and array of the lodging block and counterweight block together with the length of the elastic curved strip, the various windshield wipers of different lengths and specifications can be easily and smoothly produced by flexible and versatile manufacturing process so that not only the total manufacturing cost can be greatly decreased with enhancement of marketing competition but also the environmental protection can be accomplished.

The other object of the present invention is to provide a structure for array combinational type of windshield wiper, which not only evenly distributes the pressing elastic pressure over the windshield but also completely and closely attaches over the windshield so as to increase the scraping and wiping effect of the windshield wiper by means of suitably changing the number and array of the lodging block and counterweight block together with the length of the elastic curved strip.

BRIEF DESCRIPTION OF THE DRAWINGS

FIG. 1 is a exploded perspective view of the present invention.

FIGS. 1a and 1b are cross sectional views along lines 1a-1a and 1b-1b, respectively.

FIG. 2a is a cross-sectional view along line 2a-2a.

FIG. 3a is a cross-sectional view along line 3a-3a.

FIG. 4 is a perspective view of the elastic curved strip of the present invention.

FIG. 4a is a cross-sectional view along line 4a-4a.

FIG. 5 is a perspective view showing the first step of the assembly procedure according to the present invention.

FIG. 5a is a cross-sectional view along line 5a-5a.

FIG. 6 is a perspective view showing the second step of the assembly procedure according to the present invention.

FIG. 7 is a perspective view showing the third step of the assembly procedure according to the present invention.

FIG. 8 is a perspective view showing the fourth step of the assembly procedure according to the present invention.

FIG. 8a is a cross-sectional view along line 8a-8a.

FIG. 9 is a perspective view showing the fifth step of the assembly procedure according to the present invention.

FIG. 9a is a cross-sectional view along line 9a-9a.

FIG. 10 is a perspective view showing the sixth step of the assembly procedure according to the present invention.

FIGS. 10a and 10b are cross-sectional view along line 10a-10a and 10b-10b, respectively.

FIG. 11 is a sectional view for the lodging block in another embodiment of the present invention.

FIG. 12 is a perspective schematic view showing the combination of the wiper adapter with the present invention.

FIG. 13 is a perspective view showing the combination of the wiper arm with the present invention.

FIG. 14 is a sectional view for the lodging block in further another embodiment of the present invention.

FIG. 14a is a cross-sectional view along line 14a-14a.

FIG. 15 is a sectional view for the counterweight block in another embodiment of the present invention.

FIG. 15a is a cross-sectional view along line 15a-15a.

FIG. 16 is a sectional view for the lodging block in the other embodiment of the present invention.

FIG. 16a is a cross-sectional view along line 16a-16a.

FIG. 17 is a sectional view for the counterweight block in the other embodiment of the present invention.

FIG. 17a is a cross-sectional view along line 17a-17a.

FIG. 18 is the array combinational view for the lodging block and counterweight block of the present invention.

FIG. 19 is a exploded perspective view for another embodiment of the present invention.

FIG. 20 is a exploded perspective view showing the elongate scraper for the other embodiment of the present invention.

FIG. 20a is a cross-sectional view along line 20a-20a.

FIG. 21 is a sectional view showing the elongate scraper inserted in the lodging blocks for the other embodiment of the present invention.

DETAILED DESCRIPTION OF THE PREFERRED EMBODIMENTS

Figure 2A:
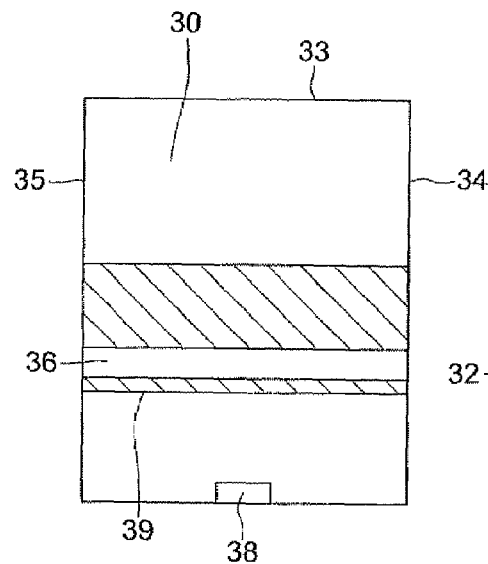
Figure 2:
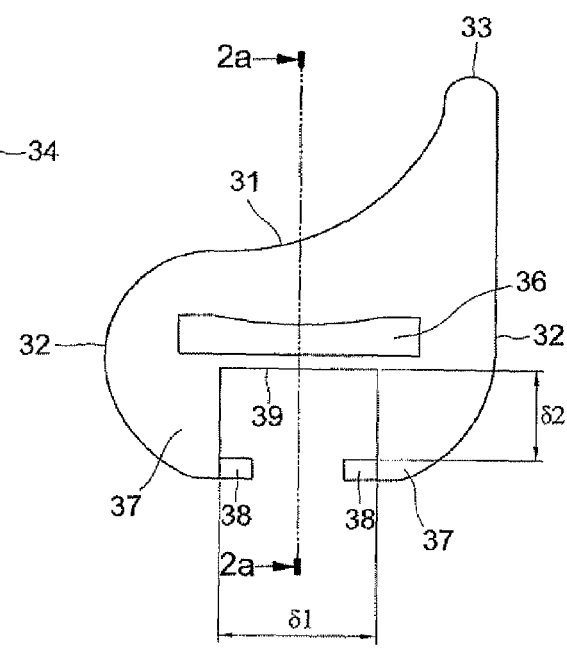
FIG. 2 is a front view of the lodging block of the present invention.
Figure 3A:
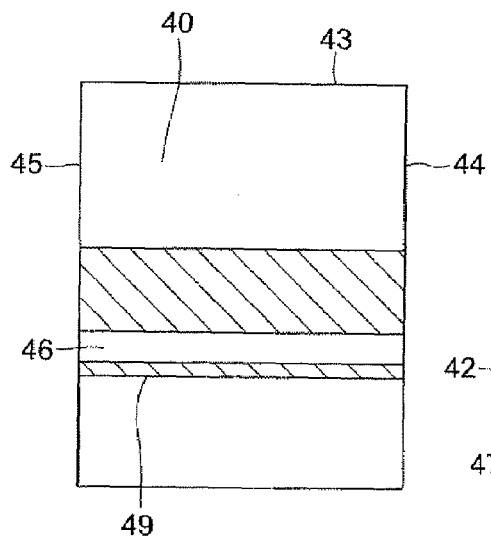
Figure 3:
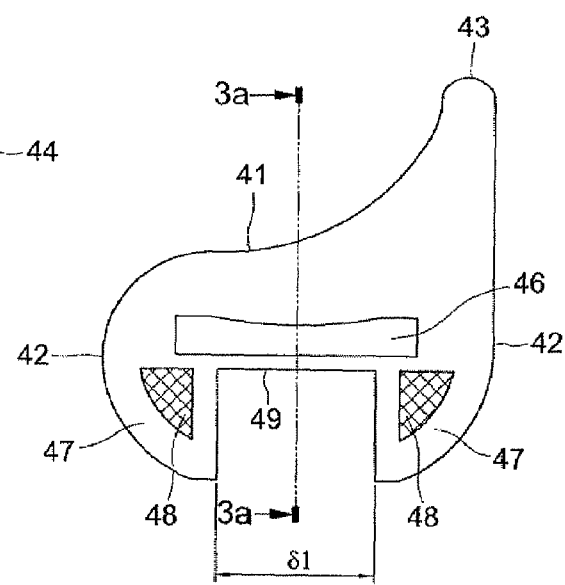
FIG. 3 is a front view of the counterweight block of the present invention.

Referring to FIGS. 1 to 3, a structure for array combinational type of windshield wiper of the present invention comprises an elastic curved strip 10, a supporting mount 20, plural lodging blocks 30, plural counterweight blocks 40, an elongate scraper 50 and two enclosing sheaths 60.

Referring to FIGS. 1 to 3, the elastic curved strip 10 which being made of metal flat strip in downwards curved slat, having a pair of rivet holes 11 punched in the middle and a fitting hole 12 penetrated near each of short lateral ends thereat.

Referring to FIGS. 1 to 3, FIG. 12 and FIG. 13, the supporting mount 20 which being pressed U-shaped metal, having a pair of perforated holes 21 punched in the middle of the internal sole for corresponding to the pair of rivet holes 11 in the elastic curved strip 10 and a fixing spindle 22 straddled over both upright flanks thereof for connection with a wiper adapter 70 (as shown in the FIG. 12) such that it being securely fixed at the end of the wiper arm S (as shown in the FIG. 13).

Referring to FIGS. 1 to 3, the plural lodging blocks 30 which being unitary extruding molded body of plastic material in hollow cuboid and set on the elastic curved strip 10 in array manner with a tapered ascending curved ridge 33 formed at the intersection of the top surface 31 and one flank 32, having an insetting sleeve slit 36 penetrated from front surface 34 through back surface 35 in the middle section thereof so that the cross sectional shape of the insetting sleeve slit 36 being same as that of the elastic curved strip 10 with tolerance consistent with the transition fit or clearance fit after assembly; a pair of symmetrical and parallel suspending joists 37 with a terminal clipping jut 38 being downwards juxtaposed apart at inside of two flanks 32 for the insetting sleeve slit 36; wherein, an interval δ1 being formed between the pair of the suspending joists 37 and an interval δ2 being formed between the top surface of the clipping juts 38 and the internal sole 39 (as shown in the FIG. 2).

Referring to FIGS. 1 to 3, the plural counterweight blocks 40 which being unitary extruding molded body of plastic and set on the elastic curved strip 10 in interlaying array manner between the lodging blocks 30 with same structure, shape and size as those of the lodging block 30 as well as a tapered ascending curved ridge 43 formed at the intersection of the top surface 41 and one flank 42, having an insetting sleeve slit 46 penetrated from front surface 44 through back surface 45 in the middle section thereof so that the cross sectional shape of the insetting sleeve slit 46 being same as that of the elastic curved strip 10 with tolerance consistent with the transition fit or clearance fit after assembly; a pair of symmetrical and parallel suspending joists 47, each of which with one metal splint counterweight 48 filled therein, being downwards juxtaposed apart at inside of two flanks 42 for the insetting sleeve slit 46; wherein, an interval 61 being formed between the pair of the suspending joists 47 (as shown in the FIG. 3).

Referring to FIGS. 1 and 2, the elongate scraper 50, which being unitary extruding molded body of elastic material, having a pair of symmetrical and parallel elongate flutes 51 being juxtaposed apart on both sides and a scraper blade 53 is formed at the lower section in taper manner thereof; wherein, the height h between the elongate flute 51 and top surface 52 being slightly less than the interval δ2 between the top surface of the clipping juts 38 and the internal sole 39 of the lodging block 30 (as shown in sectional view 1a of the FIG. 1); and the upper section width w of the top surface 52 being slightly less than the interval δ1 between the pair of the suspending joist 37 for being held therein and securely clamped by two clipping juts 38 respectively (as shown in the FIG. 2).

Referring to FIG. 1, the two terminal caps 60 each of which being a hollow cuboid used to cap each front surface 34 or back surface 35 of the lodging block 30, having each rear closed end 62 and front opening end 61, whose cross sectional shape being the same as that of each front surface 34 or back surface 35 of the lodging block 30 but with internal size being slightly larger than the outer size of the each front surface 34 or back surface 35 of the lodging block 30; besides, a clamping tenon 63 being horizontally configured on the internal central top side near the opening end 61 towards the closed end 62 therein (as shown in sectional view 1b of the FIG. 1).

Further to referring the FIG. 4 through FIG. 10, the assembly steps according to the present invention are as below:

a. Firstly put the supporting mount 20 in the middle of the elastic curved strip 10 and fix it thereon by two rivet holes 11 driving through the perforated holes 21 of the supporting mount 20 and rivet holes 11 of the elastic curved strip 10 (as shown in the FIG. 5 and a sectional view taken along the direction indicated by a line 5a-5a in FIG. 5).

b. Orderly put the lodging block 30 and counterweight block 40 in the arraying pad Y one by one to let them in cascaded array, then align and run any one end of one elastic curved strip 10 through the arrayed lodging blocks 30 and counterweight blocks 40 in the arraying pad Y (as shown in the FIG. 6 and FIG. 7).

c. As the procedure in the step b, align and run any end of the other elastic curved strip 10 through the arrayed lodging blocks 30 and counterweight blocks 40 in the arraying pad Y so that the lodging blocks 30, counterweight blocks 40 and elastic curved strip 10 are integrated together (as shown in the FIG. 8 and a sectional view taken along the direction indicated by a line 8a-8a in FIG. 8).

d. Align and set the pair of elongate flutes 51 of the elongate scraper 50 in the pair of suspending joists 47 and suspending joists 37 with terminal clipping jut 38 of each lodging block 30 and counterweight block 40 so that said elongate scraper 50 is firmly held by all lodging blocks 30 and counterweight blocks 40 (as shown in the FIG. 9 and a sectional view taken along the direction indicated by a line 9a-9a in FIG. 9).

e. Respectively align and set each opening end 61 of the two terminal cap 60 on each longitudinal end of the elastic curved strip 10 up to the bucking snap of the clamping tenon 63 with each fitting hole 12 of the elastic curved strip 10 so that two lodging blocks 30 and counterweight blocks 40 are completely confined by the two terminal cap 60 therein unable to drop off the elastic curved strip 10; Thus, the entire assembly is finished (as shown in the FIG. 10 and two sectional views taken along the direction indicated by a line 10a and 10b in FIG. 10).

Wherein, said counterweight block 40 which is depicted in the step b, is usually served as counterweight and set on the elastic curved strip 10 in interlaying array manner between the lodging blocks 30 in accordance with the pressure distribution and curvature of the windshield G so as to achieve the function of counterweight. However, the counterweight block 40 can also be array in combination with the lodging blocks 30 after having the two metal splint counterweights 48 removed off the suspending joists 47 if it is not to be served as counterweight (as shown in the FIG. 12 and FIG. 13).

As shown in the FIGS. 11, 12 and 13, when the present invention is to apply on the windshield G, just simply set the conventional wiper adapter 70 on the supporting mount 20 (as shown in the FIG. 12), it will be securely connected with the wiper arm S mutually (as shown in the FIG. 13).

As shown in the FIG. 11, in the upper portion of said lodging blocks 30 of the present invention near the curved ridge 33 and said two suspending joists 37 between the front surface 34 and back surface 35, plural hollow tunnels 301 can be created therein so as to reduce the total weight and save material cost without affecting the scraping and wiping function of the windshield wiper against the windshield G.

Figures 14, 14A:
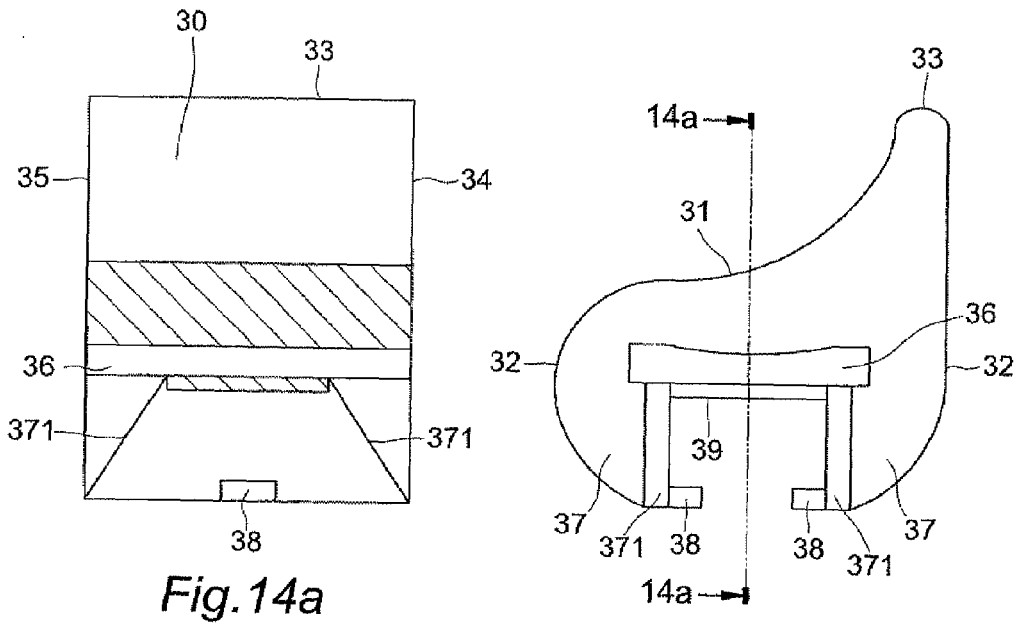
Figures 15, 15A:
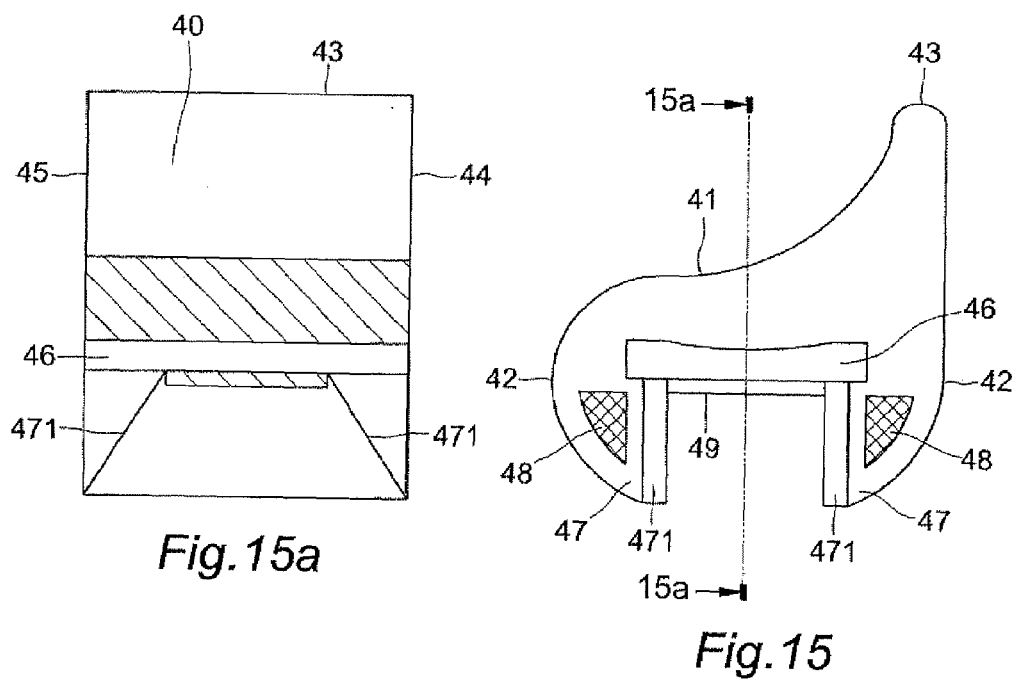

As further shown in the FIG. 14 and FIG. 15, wherein at each joint of the end of said two suspending joists 37 of said lodging blocks 30 further with the front surface 34 and back surface 35, a pair of guiding slants 371 are respectively indented therein in pointing inwards the insetting sleeve slit 36;. Similarly, at each joint of the end of said two suspending joists 47 of said counterweight blocks 40 further with the front surface 44 and back surface 45, a pair of guiding slants 471 are also respectively indented therein in pointing inwards the insetting sleeve slit 46; Thereby, these guiding slants 371, 471 are created to expedite the elastic curved strip 10 inserting operation for reducing both of the labor time and cost for the same purpose.

As furthermore shown in the FIG. 16 and FIG. 17, wherein on each said front surface 34 and said back surface 35 of the lodging block 30, a pair of opposite bulge face 341 and a recess face 351 having same corresponding bulged and recessed contour respectively but with size been slightly smaller than that of the corresponding outer rim thereof are further formed respectively thereon; Similarly, on each said front surface 44 and said back surface 45 of the counterweight block 40, a pair of opposite bulge face 441 and a recess face 451 having same corresponding bulged and recessed contour respectively but with size been slightly smaller than that of the corresponding outer rim thereof are also further formed respectively thereon; Thereby, by means of mutual button of these mating bulge faces 341, 441 and a recess faces 351, 451 in tandem manner consecutively, the serial interlaid lodging blocks 30 and counterweight blocks 40 can be closely abutted successively with each adjacent other (as shown in the FIG. 18).

As further shown in the FIG. 19, the number of said arrayed lodging blocks 30 and said counterweight blocks 40 can be accordingly increased together with the cutting length of the elongate scraper 50 during extruding mold if the length of the elastic curved strip 101 of the present invention is required to extend so that various windshield wipers of different length and specifications can be smoothly and easily produced without costing any extra expense to make new component for fitting in with the modified length and specifications.

As shown in the FIG. 20 and FIG. 21, they are the schematic views showing elongate scraper 80 according to another embodiment of the present invention. The elongate scraper 80, which being unitary extruding molded body of elastic material, having a pair of symmetrical and parallel elongate flutes 81 being juxtaposed apart on both sides thereof, a pair of elastic metal splints 83 being respectively embedded in a pair of symmetrical and parallel elongate flutes between the elongate flutes 81 and the top surface 82 and a scraper blade 84 formed at the lower section in taper manner, wherein, the height h between the elongate flute 81 and top surface 82 being slightly less than the interval 62 between the top surface of the clipping juts 38 and the internal sole 39 of the lodging block 30; and the upper section width w of the top surface 82 being slightly less than the interval 61 between the pair of the suspending joists 37 of the lodging block 30 for being held therein and securely clamped by two clipping juts 38 respectively.

In conclusion, because of the relatively less components required and the feature in flexibility for changing the number and array of the lodging block and counterweight block, the present invention can quickly manufactures various windshield wipers of different length and specifications without any extra new component due to variation of wiper length and specifications so that the optimal flexible and versatile manufacturing process can be logically achieved to have multiple benefits in cost-saving in inventory management and manufacturing cost as well as the enhancement of the marketing competition other than the environmental protection effect.

What is claimed is:

1. A structure for an array combinational-type of windshield wiper, comprising:

an elastic curved strip made from metal, wherein the curved strip has a pair of rivet holes formed in a middle portion thereof and a fitting hole formed near first and second end portions thereof;

a U-shaped supporting mount having an internal sole and a pair of upright flanks, wherein the supporting mount has a pair of holes formed in a middle portion of the internal sole which correspond to the pair of rivet holes formed in the elastic curved strip, and a fixing spindle having first and second ends thereof respectively connected to a respective upright flank of the pair of upright flanks;

a plurality of lodging blocks made from a plastic material and disposed on the elastic curved strip in an array;

wherein each lodging block has a tapered curved ridge formed at an intersection of a top surface and a flank of the lodging block, an insetting sleeve slit is formed in the lodging block from a front surface to a back surface in a middle section thereof such that a cross-sectional shape of the insetting sleeve slit is the same as a cross-sectional shape of the elastic curved strip, a cavity is formed in a bottom portion of the lodging block, and a pair of symmetrical joists suspends from the bottom portion of the lodging block;

wherein an internal sole is formed at a top portion of the cavity, and each joist has a terminal clipping jut disposed at a bottom portion of the cavity such that a first distance is defined as the distance between each joist of the pair of joists and a second distance is defined as the distance between the internal sole of the cavity and the terminal clipping juts;

a plurality of counterweight blocks made from a plastic material and disposed on the elastic curved strip in an interlaying array between the lodging blocks;

wherein each counterweight block has a tapered curved ridge formed at an intersection of a top surface and a flank of the counterweight block, an insetting sleeve slit is formed in the counterweight block from a front surface to a back surface in a middle section thereof such that a cross-sectional shape of the insetting sleeve slit of the counterweight block is the same as the cross-sectional shape of the elastic curved strip, a recess is formed in a bottom portion of the counterweight block, and a pair of symmetrical joists suspends from the bottom portion of the counterweight block;

wherein a metal splint counterweight is disposed in each of the joists of the counterweight block and a distance between the joists of the counterweight block is the first distance;

an elongate scrapper made from an elastic material, wherein a first pair of symmetrical elongate flutes is formed in first and second sides of the elongate scrapper, a lower portion of the scrapper is tapered to form a scrapper blade, a third distance defined between the first elongate flutes and a top surface of the elongate scrapper is less than the second distance, and a width of an upper section of the elongate scrapper is less than the first distance such that the upper section of the elongate scrapper is received within the cavity of the lodging block and the recess of the counterweight block, and the first elongate flutes are clamped by respective clipping juts; and two terminal caps for capping the lodging blocks, the terminal caps having a cross-sectional shape defined as the same as a cross-sectional shape of the lodging blocks, wherein an internal size of the terminal caps is at least larger that an outer size of the lodging blocks, and a clamping tenon is disposed on an inside surface of the terminal caps.

2. The structure of claim 1, wherein a hollow channel is formed in an upper portion of the lodging blocks adjacent the curved ridge.

3. The structure of claim 1, wherein both the front surface and the back surface of the lodging blocks have a bulging portion and a recess portion which corresponds to a respective bulging portion and recessed portion on each of the front and back surfaces of the counterweight blocks.

4. The structure of claim 1, wherein a pair of guiding slants is disposed at end portions of the joists of both the lodging blocks and the counterweight blocks.

5. The structure of claim 1, wherein a pair of elastic metal splints are embedded in a second pair of symmetrical elongate flutes between the first elongate flutes and the top surface of the elongate scraper.

\* \* \* \* \*